May 10, 1966  C. R. MYERS  3,250,547
HYDRAULIC CONTROL SYSTEM FOR TRAILER TRUCKS
Filed Feb. 16, 1965  2 Sheets-Sheet 1

INVENTOR
CLARK R. MYERS

BY Cushman, Darby & Cushman
ATTORNEYS

INVENTOR
CLARK R. MYERS
BY Cushman, Darby & Cushman
ATTORNEYS

3,250,547
HYDRAULIC CONTROL SYSTEM FOR TRAILER TRUCKS
Clark R. Myers, 24 Irving Road, Scotia, N.Y.
Filed Feb. 16, 1965, Ser. No. 433,097
9 Claims. (Cl. 280—432)

This invention relates to a hydraulic control device for coupled vehicles, and more particularly, is concerned with a hydraulic control device which automatically controls extreme pivotal movements of a trailer as related to a truck.

In the usual trailer truck arrangement a trailer unit is coupled to a truck which provides motive power for drawing the trailer, and the trailer is coupled by means of a fifth wheel coupling unit which provides a point about which the coupled units may pivot. Normally in a trailer or semi-trailer unit, wheels are located only under the trailing end of the unit, and the front end of the unit is supported by the coupling device attached to the truck. The truck includes a steering mechanism for turning the front wheels of the truck, and these turning movements cause the trailer to pivot about the coupling point and to follow the path described by the steering movements of the truck.

Uncontrolled or extreme pivotal movements of the trailer as related to the truck may result in a jackknifing of the two units. Jackknifing can be described as a condition when the trailer swings into an extreme position about the coupling point and where the trailing end of the trailer approaches the front of the truck. Such a condition may arise under adverse driving conditions such as where a highway is slippery and the inertia of the trailer carries it into an uncontrollable swing about the truck.

Devices have been constructed in the prior art which attempt to control and prevent jackknifing conditions, but the prior devices have not been satisfactory in providing a corrective action to such uncontrolled pivotable movements under all driving conditions. In the usual prior art control device, a special effort is required on the part of the driver to actuate the device, or the device is so designed that it controls movements under certain conditions but not under other driving conditions which may arise. Furthermore, the prior attempts to control pivotal movements of a trailer have usually been limited to some type of locking or braking means which merely locks the trailer into a given position and prevents any further extreme movements.

The present invention provides a control device which operates automatically in response to normal steering movements of a driver as he reacts to all types of driving conditions. The control device of this invention uses a hydraulic system which permits pivotal movements of a trailer unit under normal steering conditions, but which prevents extreme movements of the trailer when the truck is being turned in response to a skidding or jackknifing condition. Valves are incorporated into the hydraulic system so that hydraulic fluid may be used to brake or lock the trailer from unwanted extreme movements. It is a further feature of the present invention that while the trailer is being controlled from further jackknifing movement by the control device, it is also permitted to return to a normal or aligned position by the same control device which is preventing the jackknife.

In operation, the control device of this invention receives movements from a steering linkage of the truck and from a linkage connected to the trailer. The movements from the steering linkage affect the positions of a first set of valves within the device and the positions of the valves allow the hydraulic system to prevent or permit pivotal movements of the trailer, depending upon the steering movements effected. The hydraulic system is also actuated by a linkage connected to the trailer itself, and this linkage allows movements of a second set of valves which will cooperate with or counteract the valve positions set by the steering linkage. The combined effects of the valves prevent jackknifing movements of the trailer, while permitting all normal steering functions of the truck. In addition, the control device even permits a return of a jackknifing trailer to a normal aligned position.

Thus it can be seen that the control device responds automatically to normal and abnormal steering conditions, and the device of this invention does not require a special actuation or response by the driver of the vehicle.

A further advantage of the present invention is that this control device may be mounted on and used with existing trailer truck equipment with very little adaptation of the truck and trailer to the control device. This advantage is especially valuable when it is realized what it would cost to make major changes in existing fleets of trailer truck equipment or couplers used with the trailer trucks.

Finally, the control device of this invention is rugged in construction and reliable in its operation. The device is simply constructed, and all actuating movements are smoothly effected with the result that the entire system is more reliable and better operating for all driving responses than any device heretofore constructed.

For a better understanding of the present invention, reference will be made to the accompanying drawings in which.

Figure 1:
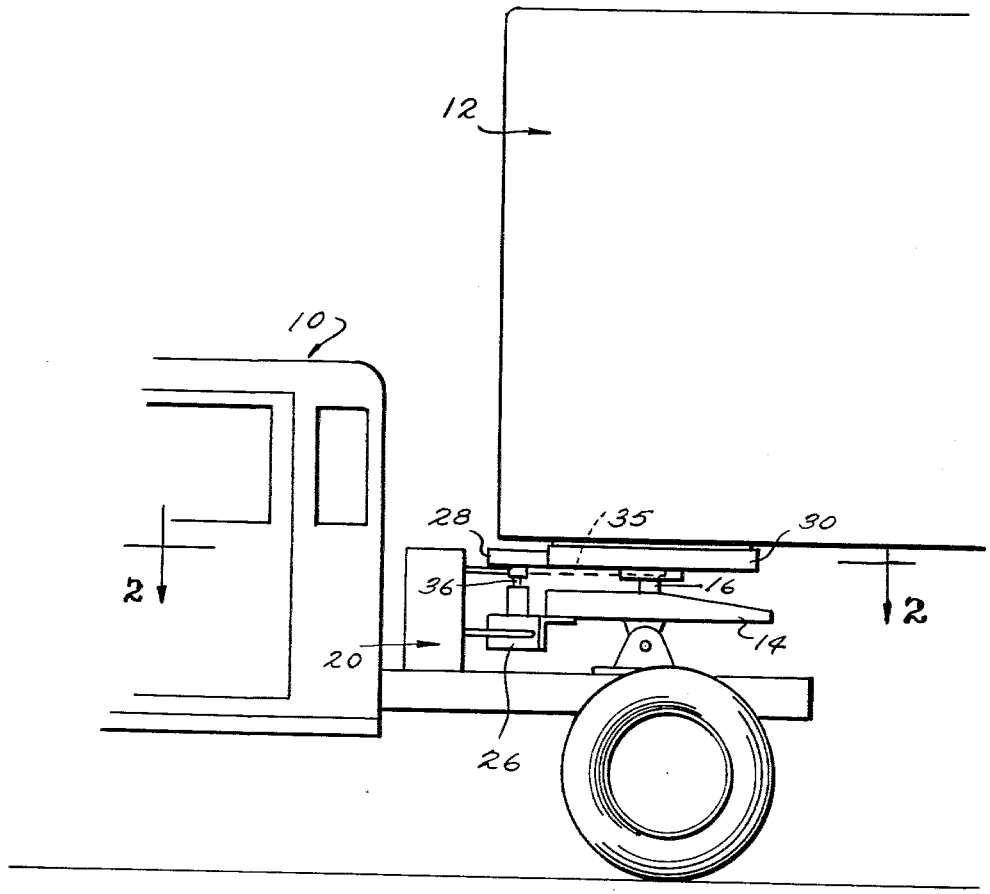
FIGURE 1 is a side elevation of portions of a truck and a trailer showing the units where coupled and also showing the control device of the present invention.

The control device of the present invention is normally used in a conventional trailer truck vehicle where the forward end of a trailer, or semi-trailer, is supported by and coupled to the trailing end of the truck. The truck unit is indicated generally by 10 and the trailer unit is shown at 12. The two units are coupled together by any suitable coupling means such as the fifth wheel coupler 14. The fifth wheel coupler 14 is mounted on the rear end of the truck 10, and the coupler is adapted to receive a pin 16 extending downwardly from the trailer into the V-shaped slot 18 of the coupler. Suitable locking devices are provided to hold the pin 16 into the coupler 14 and when the trailer is attached to the truck it can be seen that the trailer may pivot in a horizontal plane about the pivot point defined by the pin 16. Such an attachment of a trailer to a truck is entirely conventional and is designed to permit a trailer to move pivotally in relation to the truck when the truck is being steered around curves in a highway.

The control device, shown generally as 20, is suitably mounted on the truck and is connected to the steering mechanism of the truck, and also to the trailer so as to receive movements of the trailer. As will be seen in greater detail below, the control device 20 is actuated in part by steering movements of the truck, and various positions of the steering mechanism determine the types of control to be relayed to the trailer. In addition, the device is actuated by the trailer, and the position of the trailer, as related to the truck, affects the resultant control dictated by the control device.

The control device permits the trailer to be locked into following alignment for normal straight line driving, and at the same time allows the trailer to be pivotally moved about the coupling axis when the steering mechanism is moved for normal turning movements. However, when extreme turning movements take place in either the steering mechanism or in the trailer itself, the control device responds to prevent further extreme pivotal movement and to permit a return of the trailer to a normal position.

The control device 20 includes a linkage arm 22 connecting the control device with the steering link 24, which may be a tie rod from the steering mechanism of the truck. The linkage arm 22 receives steering movements from the steering of the truck and actuates the device in accordance with the particular steering movements of the truck.

The response of the device 20 to the steering movements is relayed to the trailer through a hydraulic system which controls a pump 26 connected to the reduction gear 28. A gear plate 30 is securely fixed to the trailer on a horizontal plane and is located so that the center axis of rotation of the gear plate 30 is aligned with the pivot point 16 of the trailer, as coupled to the truck. The gear plate 30 carries gear teeth around its circular periphery and these gear teeth intermesh with the teeth of reduction gear 28, so that pivotal movements of the trailer will be imparted to the reduction gear. The gears 28 and 30 act as a connection means between the trailer and the pump 26, and it will be seen that control of fluid flow in the pump 26 can be used to prevent or control the pivotal movements of the trailer.

The control feature of the device is concerned with either permitting or preventing pivotal movements of the trailer as related to the truck, and it has been found that proper control of these movements must consider not only the steering position being effected at any given time, but also the particular position of the trailer relative to the truck at that same time. In order to consider these relative and separate movements, the control device includes two valve sets 32 and 34 which are operated in the same hydraulic system. One valve set 32 is actuated by the steering movements of the truck and the other valve set 34 is operated by a linking arm 35 which detects the particular position of the trailer as related to the truck. Depending upon the positions of the two sets of valves, the hydraulic system prevents certain movements of the trailer while assisting in others, and in one position the valves prevent all pivotal movements of the trailer.

The hydraulic system of the control device includes suitable connections to the pump 26 so that flow of hydraulic fluid through the pump in either direction will be determined by the relative positions of the two sets of valves. The pump 26 is of any suitable design which permits an impeller or similar device to be rotated by the movements of the trailer as relayed through the reduction gear 28. However, the impeller may be hydraulically braked from all movements, and it is important that movement of the impeller is permitted only when fluid is allowed to flow through the pump housing. A representative structure for such a pump device which can be hydraulically braked is illustrated in Scates Patent 2,152,570 granted March 28, 1939. The direction of rotation of the impeller will be determined by the direction of flow of fluid permitted into and out of the pump, and it is important that the impeller be of such a construction that it may be prevented from rotating entirely by a prevention of flow of fluid through the pump. The pump impeller is rigidly mounted on one end of a shaft 36 which carries the reduction gear 28 at its opposite end. The reduction gear 28 is also rigidly secured to the shaft so that any rotations of the impeller or of the reduction gear 28 will be imparted to the shaft 36. Since the relative positions of the two valve sets 32 and 34 determines the direction of flow of hydraulic fluid, the turning direction of the impeller in the pump and of the reduction gear 28 is also determined by the positions of the valves 32 and 34. Also, the relative positions of the two valve sets may block all flow of hydraulic fluid, and this prevents the impeller in the pump and the reduction gear from being rotated at all.

Figure 2:
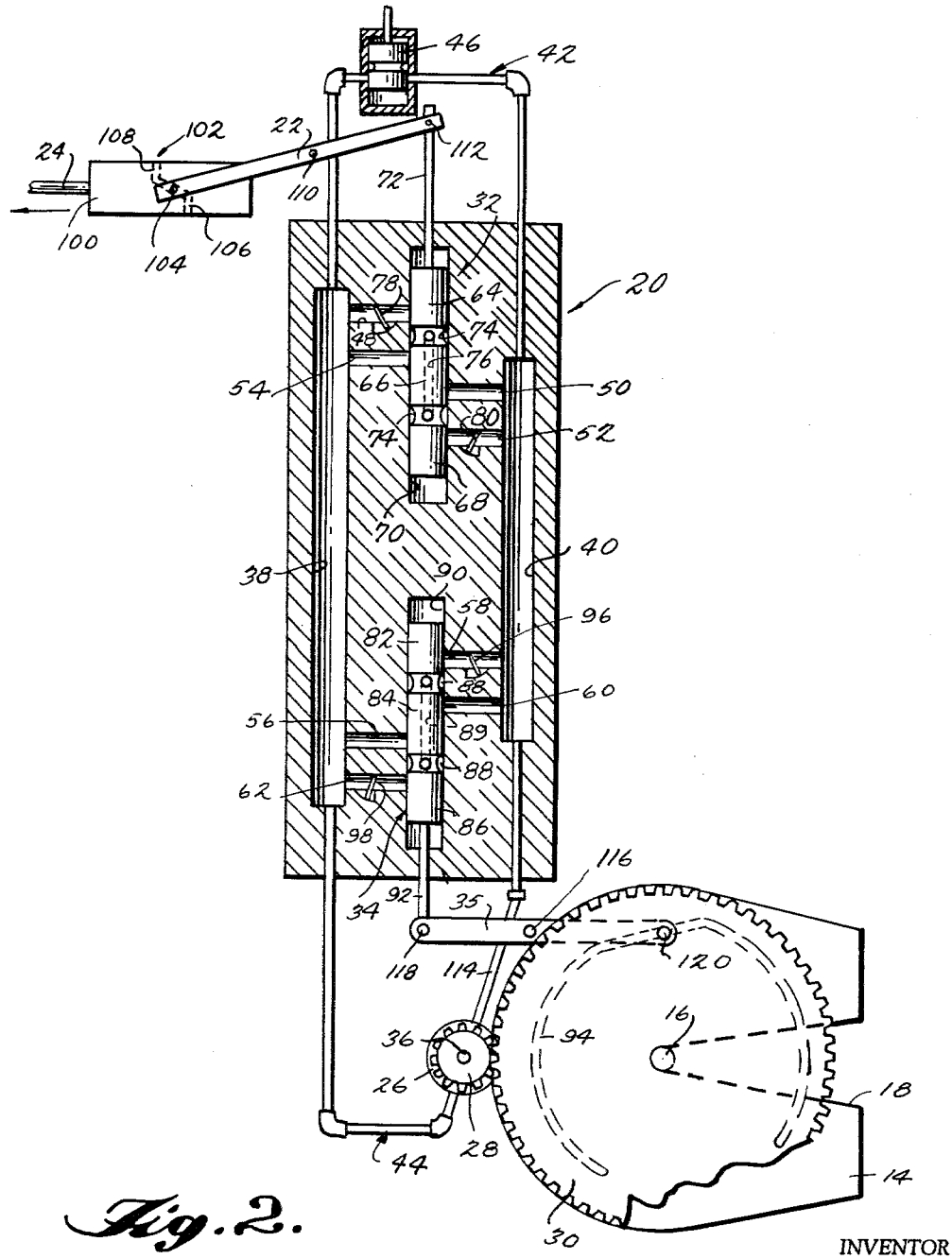
FIGURE 2 is a top plan view of FIGURE 1 taken substantially at line 2—2 of FIGURE 1, and showing an enlarged sectional view of the valve system included in the control device of this invention.

Referring to FIGURE 2 in greater detail, the control device includes a hydraulic system which has two reservoir chambers 38 and 40 connected to each other by fluid pressure pipes 42 and 44 so as to define a closed fluid circuit. A manually operated valve 46 normally closes the pipe 42 and the pump 26 is interposed in the pipe 44, therefore flow would be prevented in the system were it not for the cross-passageways 48, 50, 52 and 54 arranged for interconnection by the valve set 32, and the cross-passageways 56, 58, 60 and 62 arranged for interconnection by the valve set 34.

The valve set 32 may be of any suitable design but is shown as being made up of connected piston elements 64, 66 and 68 which are fitted for longitudinal movement in the chamber 70, and the piston elements are actuated as a unit by the connecting rod 72. The piston elements are spaced from one another to provide fluid flow through the spaces 74 transversely across the chamber 70 when the spaces between the pistons are aligned with any of the passageways 48, 50, 52 or 54. In addition, a longitudinal passage 76 interconnects the spaces 74 between adjoining piston elements so that hydraulic fluid may be caused to flow into one of the spaces 74, through the passage 76, and into the other of the spaces 74. The piston elements 64, 66 and 68 are of such a length and so spaced from one another, that a fluid connection may be made between cross-passageways 48 and 50 by aligning the two spaces 74 with the two cross-passageways. In a similar manner, the cross-passageways 52 and 54 are so spaced from the cross-passageways 48 and 50 that the spaces 74 can provide a fluid connection between 52 and 54 when the pistons and spaces 74 are properly positioned in the chamber 70. It is important that when the cross-passageways 48 and 50 are aligned for fluid communication that the cross-passageways 52 and 54 be blocked from fluid communication with each other, and it can be seen that the piston elements 66 and 68 block passageways 52 and 54, respectively, when the spaces 74 are aligned with the passages 48 and 50. In a similar manner, the passages 48 and 50 are blocked by the piston elements 64 and 66, respectively, when the passages 52 and 54 are aligned for fluid communication. The passageways 48 and 52 are further provided with check valves 78 and 80, respectively, and these valves permit only one-way flow through the passageways. It can be seen that the check valve 78 permits flow in the passageway 48 only from the reservoir 38 toward valve set 32, and the check valve 80 in passageway 52 permits flow in that passageway only from the reservoir 40 toward the valve set 32.

Thus, there is provided a linkage system which connects the steering mechanism of the truck to the first valve set 32, and movements of the steering mechanism actuate the valves to various positions which affect the flow of hydraulic fluid through a closed circuit. As will be discussed later, the particular position of the valve set 32 is a factor in determining the pivotal movements which the trailer may make under various steering conditions.

The second valve set 34, is of a similar constructtion to that just described for the valve set 32, and the valve set 34 functions to provide fluid flow between passageways 56 and 58 or between passageways 60 and 62. Piston elements 82, 84 and 86 are connected end to end so as to leave the spaces 88 between adjacent piston elements. A longitudinal bore 89 is formed to communicate between the spaces 88, and this completes a flow passage between the two spaces 88. As with the first valve set, the piston elements are fitted for longitudinal movement in the chamber 90, and the piston elements are moved as a unit by a connecting rod 92 which is actuated by the linking arm 35. The linking arm 35 receives movements from the cam track 94 which is defined on a horizontal planar surface of the gear 30 so that pivotal movements of the trailer as related to the truck will be reflected in certain movements of the linking arm 35. The cross-passageways 56, 58, 60 and 62 associated with the valve set 34 are designed to permit only one-way flow, and for that purpose check valves 96 and 98 are provided in the passageways 58 and 62, respectively. The check valve 96 permits fluid flow in the passageway 58 only in the direction from the valve set 34 toward the reservoir 40, and the check valve 98 permits fluid flow in the passageway 62 only from the valve set 34 toward the reservoir 38. As with the valve set 32, the passageways 60 and 62 are blocked when the valve set is in a position to permit flow through the passageways 56 and 58, and conversely, the passageways 56 and 58 are blocked when the valve set is in a position to permit flow through the passageways 60 and 62. The various positions of the valve set 34 are determined by the pivotal movements of the trailer in its relation to the truck. Since the control device 20 is mounted on the truck any pivotal movements of the trailer will necessarily cause a change in position of the linking arm 35 which joins the trailer to the control device.

Looking now to the operation of the control device under various driving conditions, FIGURE 2 shows the positions of the valve sets 32 and 34 and the linking arms 22 and 35 when the truck and trailer are in substantial longitudinal alignment for driving along a straight path. Both of the valve sets are in neutral positions which completely block any flow of fluid through the closed circuit hydraulic system, and the valve sets are held in their blocking positions by the linking arms 22 and 35. When the flow of hydraulic fluid is blocked, as just described, there can be no flow of fluid in either direction through the pump 26. The pump is therefore locked, and this in turn prevents any rotative movement of the reduction gear 28. Thus, the larger gear 30 is locked in the position shown and there can be no pivotal swinging movements of the trailer unit. Of course, slight movements between the trailer and truck actually take place due to tolerances allowed in the dimensions of the various elements making up the vehicle and the control device. These slight movements permit normal "tracking" of the trailer behind the truck, but the locked position of the control device as shown in FIGURE 2 prevents any other pivotal movements of the trailer relative to the truck.

When it is desired to turn the truck along a curve in the highway the driver turns the steering mechanism in the usual fashion and the steering movements move the tie rod 24. In making a right turn, for example, the tie rod is moved forward in the direction shown by the arrow, carrying with it the tie rod end element 100 which moves the linking arm 22. The tie rod end element 100 includes a groove 102 or other device to cause the end of the linking arm connected therewith to move along a predetermined path. As shown in FIGURE 2, the linking arm 22 has a follower pin 104 which connects the arm to the tie rod end and which follows the path of the groove 102. The groove 102 is designed to relay movements to the valve set 32 to one of three preselected positions: a neutral position as shown in FIGURE 2, a position that opens passageways 48 and 50, and a position that opens passageways 52 and 54. As the tie rod is moved forward in the direction of the arrow the follower pin 104 moves to the extreme position 106 of the groove, and the linking arm is pivoted a limited distance about its fixed pivot 110. Since the linking arm is coupled to the connecting rod 72 by a suitable fastener 112, pivotal movement of the linking arm 22 moves the connecting rod 72 outwardly away from the control device 20 by a predetermined distance. This movement is sufficient to place the valve set 32 in a position that permits flow of fluid from the passageway 48 to the passageway 50. In this way, the right turn movement opens a flow circuit which follows a path from the reservoir 38, through the passageways 48 and 50, through the reservoir 40, and from the reservoir 40 into the pump 26 by way of the pipe 114. It will be appreciated that since the valve set 34 is still in a blocking position, and since the check valve 78 permits flow in one direction only, any flow which takes place in the entire circuit must enter the pump 26 through the pipe 114. When hydraulic fluid enters the pump 26 from the pipe 114 the impeller in the pump and the reduction gear 28 are permitted to rotate in a clockwise direction only. It is to be noted that the reduction gear and pump impeller cannot rotate in a counterclockwise direction because fluid flow from the pump to the pipe 114 is blocked by the action of the one-way valve 78. Thus, in making a right turn steering movement, the reduction gear may only turn clockwise, and the larger gear 30, carried by the trailer, may only turn counterclockwise. This permits the trailer to swing around the pivot point 16 in a counterclockwise direction which is a normal following movement for a right turn movement of the truck.

As the trailer pivotally moves in a counterclockwise direction, the linking arm 35 is actuated. The linking arm 35 has a fixed pivot point 116, an end pin 118 fastened to the connecting rod 92 and a cam track follower 120. The cam track 94 is formed on a horizontal planar surface of the gear 30 so that movements of the gear will result in identical movements of the cam track. The cam track is so designed that turning movements of the gear 30 will cause the lever 35 to move a preselected distance in one direction or the other, depending upon the direction of rotation of the gear. Also, the cam track is designed so as to place the valve set 34 in one of three positions: a neutral position as shown in FIGURE 2, that blocks all passageways, a position that opens the passageways 56 and 58, and a position that opens the passageways 60 and 62.

When the trailer swings counterclockwise for a right turn following movement, the lever follower 120 is moved outwardly to a position in the cam track near the outer periphery of the gear 30, and the connecting arm 92 is, in turn, moved outwardly away from the control device 20. The outward movement of the connecting arm 92 through a preselected distance places the valve set 34 in a position that permits flow of fluid through passages 60 and 62. At this stage, the two valve sets 32 and 34 are positioned to allow the hydraulic fluid to flow through the closed circuit in either direction, and thus the pump, reduction gear and trailer gear may pivotally turn in either a clockwise or a counterclockwise direction.

As the right turn is completed, the steering mechanism is returnd to a neutral position which actuates the valve set 32 to a closed position, thus blocking any flow of fluid into the pump 26 from the pipe 114. However, the second set of valves 34 are still open, allowing fluid to flow from the pump through pipe 114, and accordingly, the trailer is prevented from further counterclockwise turning but is allowed free movement in a clockwise direction. When the trailer has moved into substantial longitudinal alignment with the truck, the second set of valves is returned to a closed position by the action of the lever 35 returning to the neutral part of the cam track and all further pivotal movements of the trailer are prevented.

Although the right turn movement just described contemplates normal driving conditions, it can be seen that under hazardous road conditions the control device actually prevents the initiation of a jackknifing movement by blocking any extreme or continued counterclockwise pivoting of the trailer once the driver starts to return the steering wheel to a neutral position. Further, a jackknifing movement is prevented in straight-line driving, because all pivotal movements of the trailer relative to the truck are prevented by the locked hydraulic control system. This latter control is important in straight-line driving down a long grade where braking actions of the vehicle may ordinarily tend to establish a whipping or fishtailing of the trailer relative to the truck.

In the event that a jackknifing condition arises while the driver is executing a curve to the right, as just described, it can be seen that an extreme counter clockwise movement of the trailer relative to the truck actuates the valve set 34 to allow flow of fluid through valve set 34 only in a direction opposite to that of the jackknife. In addition, the driver will react to the jackknifing condition by turning the steering mechanism to a neutral position, or to a position which is opposite to the original turning position. This reaction by the driver will place the valve set 32 in either a total blocking position, or in a position that permits fluid flow only in a direction opposed to the jackknifing movement. The combined effect of the two valve set positions will be to immediately block further jackknifing of the trailer, while at the same time permitting a free flow of fluid in a direction that will assist in letting the trailer move back to a normally aligned position. Once the trailer reaches a normally aligned position, both valve sets are automatically placed in a blocking position, and as a result, the trailer is prevented from swinging past a normal position and creating a new jackknife condition in the opposite direction. Thus, the control device serves to prevent jackknife conditions from arising; permits a correction of such conditions when they do arise; and further prevents new jackknifing or uncontrolled extreme movements from developing when a jackknife condition is being corrected.

Left turn movements will affect the control device in essentially the opposite manner from that described for right turn movements. In making a left turn the tie rod 24 will be moved toward the control device and follower 104 of the linking arm 22 will be positioned in the 108 position of the groove 102. This position causes the valve set 32 to open the passageways 52 and 54 for fluid flow in a direction from the passageway 52, through the space 74, through the bypass bore 76, and to the passageway 54. Fluid flow in the opposite direction is prevented by the check valve 80 and by the valve set 34 which is set in a closed position at the beginning of a turn.

In making a left turn, flow of hydraulic fluid enters the pump 26 from a direction opposite to that described for the right turn, and therefore the pump and reduction gear 28 are permitted to rotate only in a counterclockwise direction. This, in turn, allows the trailer to turn in only a clockwise pivotal direction around the point 16, and a normal following action results for the left turn being executed by the driver. As the trailer pivots in a clockwise direction, the follower 120 of the linking arm 35 moves to the inside position dictated by the cam track 94 and the valve set 34 is opened to allow fluid flow from passageway 56 to passageway 58. As the driver returns the steering mechanism to a neutral position, the valve set 32 is moved to a completely closed position, and the opened valve set 34 permits fluid flow only in a direction that will allow the trailer to return to a normal, aligned position. As discussed for the right turn, extreme movements of the trailer are prevented, and a jackknifing movement in the direction of the left turn is prevented or corrected once the driver returns the steering mechanism to a neutral or a correcting position.

The valve 46 is in a normally closed position to prevent any flow of fluid through the pipe 42, however this valve may be manually opened by the driver through suitable connections, so that fluid may flow in either direction through the pump 26. The opening of the valve 46 effectively cancels any control action by the control device. The valve 46 is opened when the truck is being backed or parked by the driver so as to permit extreme and unusual positions of the truck steering mechanism and the trailer position when such maneuvers are being executed.

The invention as just described is easily manufactured of any material which provides the strength and pressure sealing necessary in hydraulic devices. The separate valve sets used may be formed integrally from single pieces of stock material with proper amounts of material being removed to provide the spaces 74 and 88, and with the passageways 76 and 84 being bored therethrough by known methods. The assembled unit is rugged in construction, and reliable in all of its actions. The use of the control device provides a smoother control of a trailer under a wider range of driving conditions than with prior control devices.

Although but a single embodiment of the present invention has been described, other embodiments will occur to those skilled in the art. It is possible, of course, to use various features of the embodiment described separately or in various combinations. Also, many structural changes are possible and are intended to be within the scope of the present invention.

What is claimed is:

1. A vehicle control apparatus for controlling relative pivotal movement between a trailer and a tractor to which the trailer is coupled, comprising:
   a closed hydraulic fluid circuit,
   pump means interposed in said circuit, said pump being driven in one of two relative directions in accordance with the direction of flow of hydraulic fluid in said closed hydraulic fluid circuit, and said pump being locked from any rotative movement when flow of hydraulic fluid in the circuit is stopped,
   a first valve set and a second valve set placed in said hydraulic circuit, said valve sets being movable to a plurality of flow controlling positions so as to control the flow and the direction of flow of fluid through said circuit,
   actuation means connected to said first valve set and to a steering mechanism of the truck, whereby said first valve set may be actuated to a plurality of fluid flow controlling positions by movements of said steering mechanism,
   actuation means connected to said second valve set and to the trailer so that pivotal movements of the trailer will actuate said second set of valves to a plurality of fluid flow control positions, and
   connecting means between said trailer and said pump whereby pivotal movements of the trailer may be controlled by fluid flow through said pump as dictated by the relative positions of the two valve sets.

2. A vehicle control apparatus as claimed in claim 1 wherein the plurality of flow controlling positions for said first valve set includes a neutral position which blocks all fluid flow past the valve set, a left turn flow position which permits fluid flow past the valve set in a first direction only, and a right turn flow position which permits fluid flow in a second direction only said second direction being opposite to the said first direction of flow.

3. A vehicle control apparatus as claimed in claim 1 wherein the plurality of flow controlling positions for said second valve set includes a neutral position which blocks all fluid flow past the valve set, a left swing position corresponding to a left swing of the trailer relative to the truck and which permits fluid flow in a first direction only, and a right swing position corresponding to a right swing of the trailer and which permits fluid flow past the valve set in a second direction, said second direction being opposite to the said first direction of flow.

4. A vehicle control apparatus as claimed in claim 1 wherein the connecting means between said trailer and said pump comprises:

a horizontally disposed plate secured to said trailer and having gear teeth formed on an outer circular periphery of said plate, said plate having a vertical axis of rotation common with the pivotal axis of rotation of the trailer relative to the truck, and a reduction gear intermeshed with the gear teeth of said plate, said reduction gear being connected to said pump for rotative movements dictated by said pump, whereby movements of the horizontally disposed plate will be determined by the flow and the direction of flow of hydraulic fluid through said pump.

5. The control apparatus as described in claim 1, and including manual control means for inactivating said hydraulic circuit control means.

6. A control apparatus for controlling and preventing relative pivotal movements between a trailer and a tractor coupled to said trailer, comprising:

hydraulic control means responsive to the steering mechanism of the truck, and responsive to the relative position of the trailer to the truck, pump means associated with said hydraulic control means for receiving hydraulic responses from the hydraulic control means, said pump means operating only in response to hydraulic fluid through said pump, flow control means in said hydraulic control means for determining the flow and the direction of flow of hydraulic fluid through said pump, said flow control means being actuated by said steering mechanism and said relative position of the trailer to the truck, and wherein said flow control means comprises a first valve set and a second valve set, said two valve sets being movable to selected positions which control the flow of hydraulic fluid through said hydraulic control means, a first actuating means connecting said first valve set to the steering mechanism of the truck for moving said first valve set in response to movements of said steering mechanism, and a second actuating means connecting said second valve set to said trailer for moving said second valve set in response to pivotal movements of the trailer and connection means between said pump and said trailer, said connection means being movable in response to pivotal movements of said trailer, and movements of the connection means being controlled or prevented in accordance with the flow and direction of flow of hydraulic fluid through said pump, whereby pivotal movements of said trailer will be determined by responses made by the hydraulic control means.

7. A control device as claimed in claim 6 in which said connection means between said pump and said trailer comprises a gear plate horizontally mounted on said trailer and arranged to rotate with pivotal movements of the trailer, and a reduction gear intermeshed with said gear plate, said reduction gear being rigidly connected to said pump, whereby movements of said trailer will be imparted to said pump, and movements of said trailer will be controlled by said pump.

8. A control device as claimed in claim 7 in which said gear plate is horizontally disposed on said trailer so as to have an axis of rotation which is the same as the pivotal axis of movement of the trailer when said trailer is coupled to said truck.

9. A control device as claimed in claim 8, and including manual control means for inactivating said hydraulic control means.

References Cited by the Examiner
UNITED STATES PATENTS

| | | | |
|---|---|---|---|
| 2,461,212 | 2/1949 | Hanna | 280—432 |
| 2,564,592 | 8/1951 | Bishop | 280—432 |
| 2,692,145 | 10/1954 | Hammond et al. | 280—432 |
| 2,692,146 | 10/1954 | Black | 280—432 |
| 2,762,634 | 9/1956 | Moseley | 280—432 |
| 2,804,314 | 8/1957 | Billingsley | 280—432 |

LEO FRIAGLIA, *Primary Examiner.*